(12) United States Patent
Gibbons et al.

(10) Patent No.: US 7,353,619 B2
(45) Date of Patent: Apr. 8, 2008

(54) DUAL PURPOSE LIGHT ASSEMBLY

(75) Inventors: Louis August Gibbons, Stevensville, MD (US); David C. Campbell, Bel Air, MD (US)

(73) Assignee: Black & Decker Inc., Towson, MD (US)

( * ) Notice: Subject to any disclaimer, the term of this patent is extended or adjusted under 35 U.S.C. 154(b) by 0 days.

(21) Appl. No.: 11/673,680

(22) Filed: Feb. 12, 2007

(65) Prior Publication Data

US 2007/0171630 A1 Jul. 26, 2007

Related U.S. Application Data

(63) Continuation of application No. 11/283,633, filed on Nov. 21, 2005, now Pat. No. 7,174,655.

(51) Int. Cl.
*G01B 3/10* (2006.01)
(52) U.S. Cl. .............................. 33/761; 33/227; 33/770; 33/759; 33/768
(58) Field of Classification Search .......... 33/759–761, 33/768, 770, 227, DIG. 21
See application file for complete search history.

(56) References Cited

U.S. PATENT DOCUMENTS

| | | | |
|---|---|---|---|
| 2,992,487 A | 7/1961 | Miller | |
| 4,462,160 A | 7/1984 | Cohen et al. | |
| 4,580,347 A | 4/1986 | McKnight | |
| 4,944,097 A * | 7/1990 | Kang | 33/760 |
| 6,030,091 A | 2/2000 | Li | |
| 6,209,219 B1 | 4/2001 | Wakefield et al. | |
| 6,360,446 B1 | 3/2002 | Bijawat et al. | |
| 6,763,598 B1 | 7/2004 | Chen | |
| 6,928,029 B2 * | 8/2005 | Rickman | 33/770 |
| 2003/0000099 A1 | 1/2003 | Wang | |
| 2006/0179672 A1 | 8/2006 | Tacklind | |

* cited by examiner

*Primary Examiner*—Yaritza Guadalupe-McCall
(74) *Attorney, Agent, or Firm*—Shook, Hardy & Bacon L.L.P.

(57) ABSTRACT

This invention is directed to an automatic tape measure having a housing, a tape assembly, and a light assembly. The tape assembly is supported in the housing and contains a reel having a tape adapted to extend and retract from the front wall of the housing. The light assembly is received in the housing and contains a power source, a light source, a switch, and a lens. The lens is coupled with an opening in the front wall of the housing and is adapted to move between a first position where the light source passes through the lens and a second position where the light source projects downwardly onto the extended tape.

20 Claims, 2 Drawing Sheets

DUAL PURPOSE LIGHT ASSEMBLY

CROSS-REFERENCE TO RELATED APPLICATIONS

The present application is a continuation of U.S. application Ser. No. 11/283,633, entitled "DUAL PURPOSE LIGHT FOR AUTOMATIC TAPE MEASURE", filed Nov. 21, 2005 now U.S. Pat. No. 7,174,655.

STATEMENT REGARDING FEDERALLY SPONSORED RESEARCH OR DEVELOPMENT

Not Applicable.

BACKGROUND OF THE INVENTION

This invention relates generally to a tape measure and, more particularly, to an automatic tape measure with a dual purpose light that may be used as a flashlight or to illuminate the upper surface of the tape to assist the user in obtaining a reading.

Traditional tape measures are generally used to measure an existing object or as a tool for marking and measuring distances. While tape measures are good for measuring objects and distance, this task becomes difficult in the absence of light, either in dark conditions or from a user's shadow. Illuminated tape measures are known in the art and come in several forms. One example, shown in U.S. Pat. No. 2,992,487 to Miller, discloses a tape measure with a flashlight that is received within the housing. A light is projected from the flashlight portion in a direction generally parallel to the extended tape of the tape measure. Another example is shown in U.S. Pat. No. 4,580,347 to McKnight. McKnight discloses a tape measure with a battery-powered light that is contained within the housing. When illuminated, the light projects downwardly upon the top surface of the tape. Despite there teachings, however, no embodiment exists where the light source is able to project a beam both in a direction generally parallel to the path of an extended tape as well as downwardly towards the top surface of the tape. Thus, it would be desirable to manufacture a tape measure with a light source capable of both functions.

Additionally, while tape measures with light sources are known in the art, there remains a need for a tape measure with a simple light source that may be used as a flashlight to emit a beam in a path generally parallel to the tape as well as to assist with obtaining a measurement by shining downwardly upon the top surface of the tape.

BRIEF SUMMARY OF THE INVENTION

This invention is directed to an automatic tape measure with a dual-purpose light. The tape measure contains a housing, a tape assembly, and a light assembly. The housing is a container configured to hold both the tape assembly and the light assembly. The tape assembly preferably includes a tape, a tape switch, a reel, and a drive. The tape switch is located in a top wall of the housing and is used in conjunction with the drive and the reel to extend and retract the tape.

The light assembly preferably includes a light source, a lens, a power switch, and a power source. The light source and the power source are received within the housing. The lens is coupled with a window located in a front wall of the housing. The lens contains an upper and a lower portion. Further, the lens is movable between a first and a second position. The light source is activated by the power switch. In the first position, the lens permits the light source to pass through the upper portion of the lens and exit the housing in a direction generally parallel to the tape when extended. In the second position, the lens reflects the light source off of a reflective surface applied to the lower portion of the lens and the light source is directed downwardly onto the extended tape.

BRIEF DESCRIPTION OF THE SEVERAL VIEWS OF THE DRAWING

These and other objectives and advantages of the present invention will be more readily apparent from the following detailed description of the drawings of the preferred embodiment of the invention that are herein incorporated by reference and in which.

DETAILED DESCRIPTION OF THE INVENTION

Figure 1:
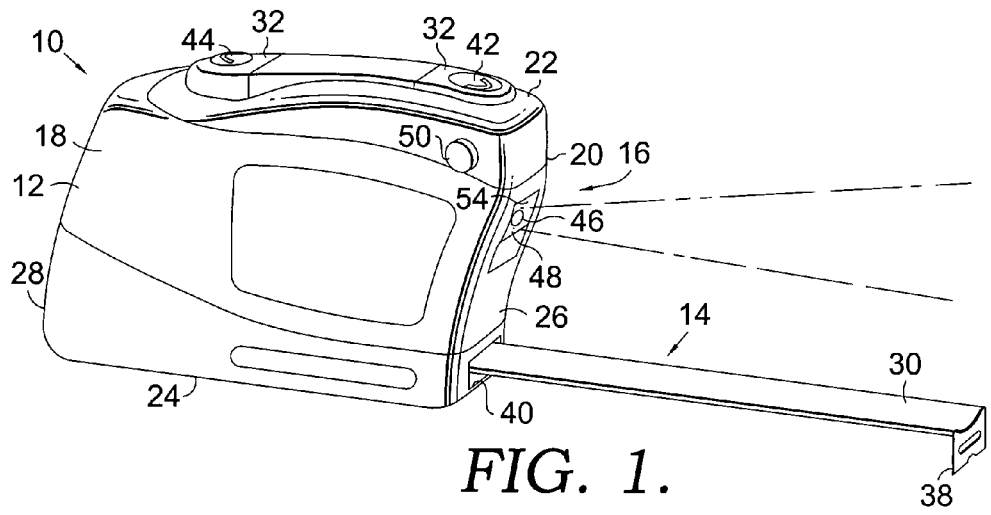
FIG. 1 is a perspective view of an automatic tape measure with the lens in the closed position.
Figure 2:
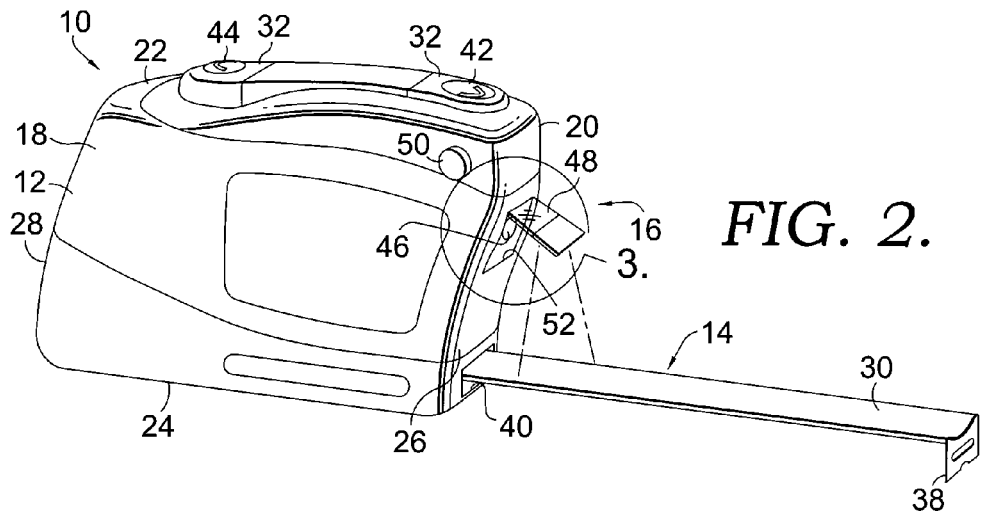
FIG. 2 is a perspective view similar to FIG. 1, but with the lens in the open position.
Figure 3:
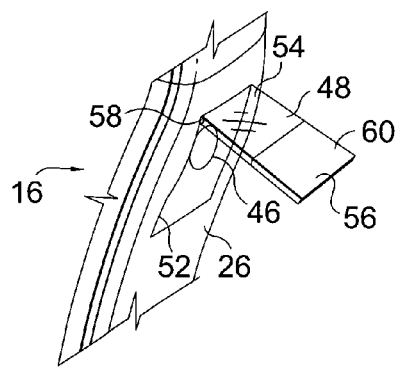
FIG. 3 is an enlarged view of the lens in FIG. 2.

With initial reference to FIGS. 1-3, an automatic tape measure according to the principles of the present invention is designated generally with the reference numeral 10. While an automatic tape measure is shown, it will be appreciated by one of ordinary skill in the art that a conventional manual tape measure may be used. The tape measure 10 generally includes a housing 12, a tape assembly 14, and a light assembly 16. The housing 12 generally includes a pair of side walls 18, 20, top and bottom walls 22, 24, a front wall 26, and a rear wall 28. The housing 12 is generally an integrated unit constructed from molded plastic, however, any suitable material may be used. The housing 12 is configured to define a container, which houses both the tape assembly 14 and the light assembly 16.

The tape assembly 14 consists generally of a tape 30, a tape switch 32, a reel 34, not shown, and a drive 36, not shown. The reel and drive 34, 36 are conventional items that are known in the art and not germane to this discussion. The tape 30 includes a stop 38 and extends from a lateral opening 40 in the front wall 26. The extension of the tape 30 is controlled by the tape switch 32 located in the top wall 22 of the housing 12. The tape switch 32 includes forward and rearward adjustment buttons 42, 44. It will be appreciated by one of ordinary skill in the art that the adjustment buttons 42, 44 allow for forward movement and rearward retraction of the tape 30 via the reel 34 and the drive 36.

Referring again to FIGS. 1-3, the light assembly 16 will now be discussed. The light assembly 16 includes a light source 46, a lens 48, a switch 50, and a power source 52, not shown. FIG. 1 shows the lens 48 in the closed position while FIG. 2 shows the lens 48 in the open position. It will be appreciated by one of ordinary skill in the art that the same power source 52 for the automatic tape measure 10 may be used for the light assembly 16. Additionally, if the tape measure is a manual version, the power source 52 for the light assembly 16 will have to be added. The power source may be an internal battery or any other suitable power source. As best seen in FIG. 1, the light source 46 is attached within the housing 12 and orientated such that it projects a beam straight out, away from of the housing 12 and in a direction generally parallel to the extended tape 30. Any suitable attachment method may be used to couple the light source 46 within the housing 12.

The lens 48 is located in a window or opening 52 in the front wall 26 of the housing 12. As shown in FIG. 3, the lens 48 is preferably a standard clear plastic lens. The clear plastic lens of the present invention is a standard item that has been commonly used in flash lights and is known by those of ordinary skill in the art. The lens 48 is generally rectangular in nature and contains an upper portion 54 and a lower portion 56. The upper portion 54 of the lens is hingedly coupled at connection 58 with an upper portion of the window 52 in the housing 12, thereby allowing for pivotal movement of the lower portion 56 about the upper portion 54 when the lens 48 is moved between the closed and open positions. In one embodiment, the lower portion 56 of the lens 48 is covered with a reflective surface 60. The reflective surface 60 is fixably attached via adhesive to the lower portion 56. It is understood by one of ordinary skill in the art that the reflective surface 60 may be located on an inner or an outer surface of the lower portion 56 of the lens 48. It should also be understood that any suitable attachment method may be used. In an alternate embodiment, and as should be further understood, the lens 48 is not covered with a reflective surface but, instead, the normal and standard attributes and characteristics of the inner and outer surfaces of the clear plastic lens 48 will naturally act as a reflective surface 60 when light strikes the same at a non-perpendicular angle.

As stated above, FIG. 1 shows the tape measure 10 with the lens 48 in the closed position and locked flush within the window 52. Locking is provided by friction in the hinged connection 58 between the lens 48 and the window 52. In the closed position, the light source 46 projects a beam of light that travels in a direction generally parallel to the path of the extended tape 30 through the upper portion 54 of the lens 48. Further, the beam from the light source 46 travels through the upper portion 54 and away from the housing 12 thereby creating a "spot" beam away from the tape measure 10, consistent with that of a conventional flashlight.

FIGS. 2 and 3 show the tape measure 10 with the lens in the open position. The lower portion 56 has been rotated about the upper portion 54 to place the lens 48 at an angled position. With the lens 48 in the angled position, the light source 46 projects the beam of light away from the housing 12 and, for at least a large portion thereof, into contact with the lower portion 56 of the angled lens 48. As stated above, the lower portion 56 contains the reflective surface 60. The reflective surface 60 then directs the beam from the light source 46 downwardly onto the tape 30. The reflective surface 60 also disburses the beam to provide a "flood" beam or light onto the tape 30. The "flood" beam provides an illuminated work area that makes marking and measuring easier and more convenient. It should be understood that a portion of the beam of light may still pass through the angled lens 48 above the lower portion 56 and in a direction generally parallel to the path of the extended tape 30. As discussed above, in the alternate embodiment where the normal characteristics of clear plastic lens 48 are relied upon to provide the reflective surface 60, the lens 48, in the open position, is at a non-perpendicular angle with respect to the beam projecting out of the housing 12 sufficient to cause at least a portion of the beam to be reflected downwardly onto the tape 30 by the inner and outer surfaces of the clear plastic lens 48.

The switch 50 is located in the top wall 22 of the housing 12. The switch 50 is connected with the power source 52, not shown, and the light source 46 as is understood by one of ordinary skill in the art. The switch 50 is activated by the user to energize the light source 46, which is powered by the power source 52. The light source 46 may be activated by the switch 50 for use with the lens 48 in both the closed and open positions.

In operation the tape measure 10 can be used in two separate configurations. In the closed position of FIG. 1, the switch 50 is pressed by the user to activate the light source 46. Once the switch 50 is activated, the beam from the light source 46 projects away from the housing 12 through the upper portion 54 of the lens 48 in a direction generally parallel to the extended tape 30. The light source 46 creates a "spot" beam away from the tape measure, consistent with that of a conventional flashlight.

Referring now to FIGS. 2 and 3, the user rotates the lower portion 56 of the lens 48 about the upper portion 54 to convert the lens 48 from the closed position to the open position. Rotation is accomplished via the hinged connection 58 between the upper portion 54 of the lens 48 and the upper portion of the window 52. The lens 48 is held in the open position by friction in the hinged connection 58. In the open position, the beam from the light source 46 projects away from the housing 12 and contacts the lower portion 56 of the lens 48 containing the reflective surface 60. The reflective surface 60 directs the beam downwardly onto the extended tape 30. The reflective surface 60 disburses the beam to provide a "flood" beam or light onto the tape 30.

Figure 4:
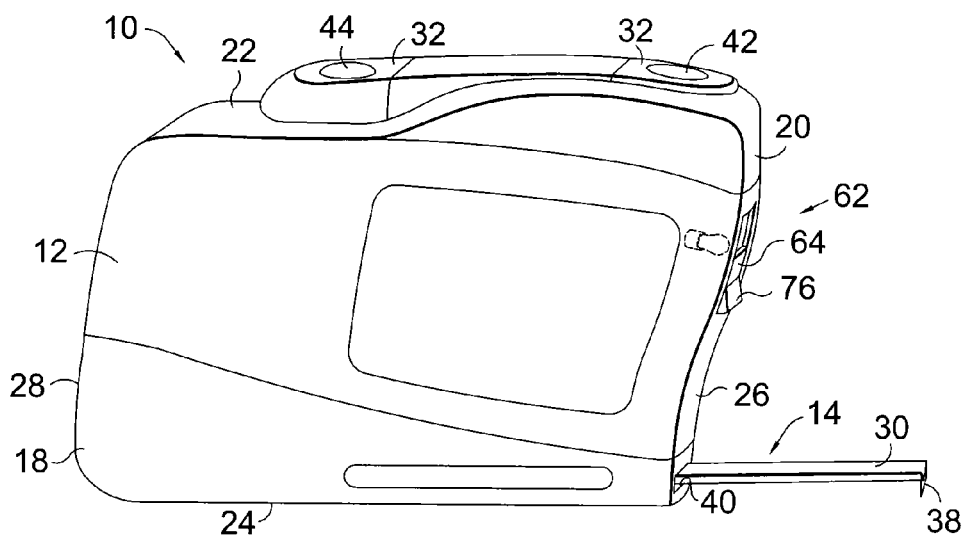
FIG. 4 is a perspective view of an alternate embodiment of an automatic tape measure with the lens in an off position.
Figure 5:
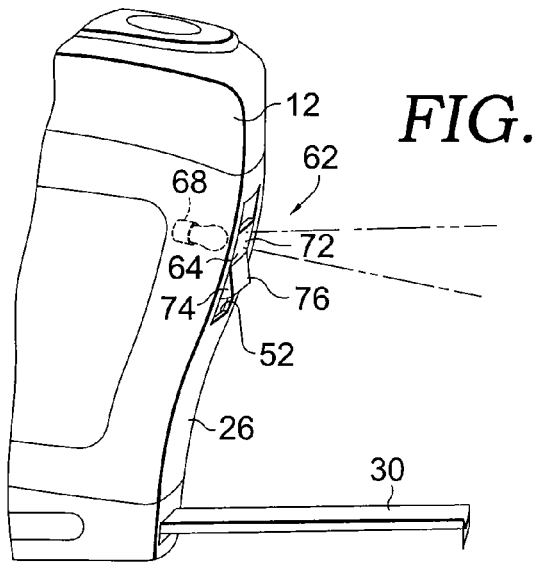
FIG. 5 is a perspective view similar to FIG. 4, but with the lens in a first position.
Figure 6:
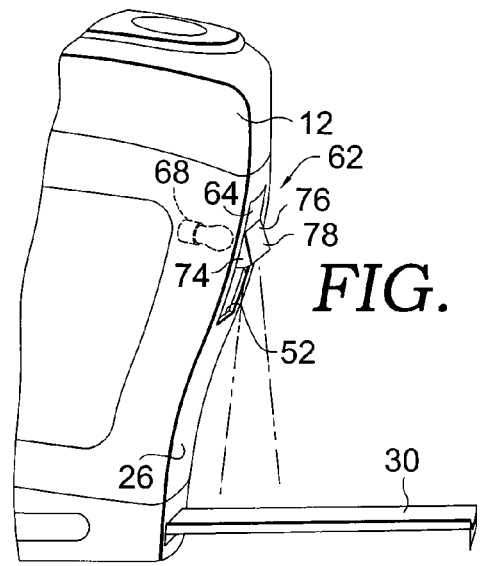
FIG. 6 is a perspective view similar to FIG. 4, but with the lens in a second position.

Referring now to FIGS. 4-6, an additional embodiment of the tape measure 10 is shown. The embodiment shown in FIGS. 4-6 is the same as the embodiment shown in FIGS. 1-3 with the exception of the light assembly 16. The light assembly 16 has been replaced by light assembly 62. The tape measure 10 generally includes the housing 12, the tape assembly 14, and the light assembly 62. The housing 12 generally includes the pair of side walls 18, 20, the top and bottom walls 22, 24, the front wall 26, and the rear wall 28.

The tape assembly 14 consists generally of the tape 30, the tape switch 32, the reel 34, not shown, and the drive 36, not shown. The tape 30 includes the stop 38 and extends from the lateral opening 40 in the front wall 26. The extension of the tape 30 is controlled by the tape switch 32 located in the top wall 22 of the housing 12. The tape switch 32 includes the forward and reward adjustment buttons 42, 44.

Referring now to FIGS. 5 and 6, the light assembly 62 will be discussed. The light assembly 62 of the additional embodiment includes a lens 64, a slide switch 66, not shown, a light source 68 and a power source 70, not shown. The lens 64 is slidably coupled with the window 52 in the front wall 26 of the housing 12. FIG. 4 shows the lens 64 in an off position. FIG. 5 shows the lens 64 in a first, intermediate position, where the light source 66 projects a beam of light through the lens 64 in a direction generally parallel to the extended tape 30. FIG. 6 shows the lens 64 in a second, upper position, where the beam from the light source 68 is directed downwardly onto the extended tape.

As shown in FIGS. 5 and 6, the lens 64 is generally rectangular in nature with an upper portion 72 and a lower portion 74. As stated above, the lens 64 is slidably coupled within the window 52 in the front wall 26 of the housing 12. The upper portion 72 is a standard clear lens that allows the beam from the light source 68 to travel through and project a "spot beam" in a direction generally parallel to the extended tape 30, as shown in FIG. 5. As shown in FIG. 6, the lower portion 74 contains an angled member 76 with a reflective surface 78 attached thereto. The reflective surface 78 is attached to an outer surface of the angled member 76 of the lower portion 74. It will be appreciated by one of ordinary skill in the art that any attachment method may be used. The reflective surface 78 of the angled member 76 directs the light source 68 downwardly onto the tape 30. The reflective surface 78 disburses the beam from the light source 68 to provide a "flood" beam or light onto the extended tape 30 that illuminates the work area thereby allowing for easier marking and measuring.

The lens 64 is coupled with the slide switch 66, not shown, within the housing 12. The slide switch 66 is a standard mechanical slide switch that is commonly known to one of ordinary skill in the art. The slide switch 66 is connected to the light source 68 and the power source 70. The slide switch 66 serves to activate the light source 68 when the lens 64 is moved from the off position of FIG. 4 to either the first or second position, shown in FIGS. 5 and 6 respectively. It is also understood by one of ordinary skill in the art that the lens 64 could be coupled with electrical contacts to accomplish the same purpose.

In operation, the additional embodiment of the light assembly 62 can be used in two distinct configurations. When the lens 64 is moved from the off position, shown in FIG. 4, to either the first or second position, shown in FIGS. 5 and 6 respectively, the sliding switch 66 energizes the light source 68. As seen in FIG. 5, when the lens 64 is moved from the off position to the first position, the light source 68 is activated and the beam from the light source 68 projects away from the housing 12 through the upper portion 72 of the lens 64 in a direction generally parallel to the extended tape 30. The beam creates a "spot" beam away from the tape measure, consistent with that of a conventional flashlight.

When the lens is moved to the second position, shown in FIG. 6, the light source 68 remains activated. It should also be apparent that movement from the off position to the second position will energize the light source 68. In the second position, the beam from the light source 68 projects away from the housing 12 and contacts the reflective surface 78 on the angled member 76 of the lens 64. The beam reflects off the surface 78 and projects downwardly onto the extended tape 30. The reflective surface 78 disburses the beam to provide a "flood" beam or light onto the tape 30.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the claims.

What is claimed is:

1. A dual purpose light assembly for coupling with a housing, the light assembly comprising:
   a power source,
   a light source coupled with the power source to produce a beam of light,
   a switch coupled with the power source and the light source, the switch being adapted to activate the light source, and
   a lens spaced apart from the light source, having a reflective surface and being movable between a first position and a second position;
   wherein the beam projects away from the light source such that a portion of the beam passes through the lens when the lens is in the first position, and wherein at least a portion of the beam is reflected downwardly by the lens when the lens is in the second position.

2. The light assembly of claim 1, wherein the lens is rotatable between the first and second positions.

3. The light assembly of claim 2, wherein the first position is a closed position and the second position is an open position.

4. The light assembly of claim 3, wherein the lens is rotated upwardly to an angled orientation in the open position.

5. The light assembly of claim 4, wherein the lens has first and second portions, wherein the first portion has a reflective surface applied thereto, and wherein movement of the lens from its first position to its second position moves at least a portion of the reflective surface on the first portion into a path of the beam.

6. The light assembly of claim 1, wherein the power source is a battery and the light source is a light bulb.

7. The light assembly of claim 1, wherein the lens is slidable between the first and second positions.

8. The light assembly of claim 7, wherein the lens further includes an off position.

9. The light assembly of claim 8, wherein the switch is adapted to activate the light source when the lens is moved from the off position to the first or second position.

10. The light assembly of claim 9, wherein a first portion of the lens has an angled member with a reflective surface thereon.

11. The light assembly of claim 10, wherein at least a portion of the beam of light is directed downwardly by the reflective surface when the lens is in the second position.

12. The light assembly of claim 11, wherein at least a portion of the beam passes through a second portion of the lens when the lens is in the first position.

13. The light assembly of claim 1, wherein the housing is a component of a hand-held tool.

14. A light assembly coupleable with a housing, the light assembly having:
   a power source,
   a light source coupled with the power source to produce a beam of light,
   a switch coupled with the power source and the light source, the switch being adapted to activate the light source, and
   a lens spaced apart from and rotatable with respect to the light source, the lens having first and second portions, the first portion having a reflective surface applied thereto, wherein the lens is adapted to move between a first position and a second position;
   wherein the beam projects away from the light source and passes through the second portion of the lens when the lens is in the first position, and wherein at least some of the beam is reflected downwardly by the reflective surface of the lens when the lens is in the second position.

15. The light assembly of claim 14, wherein the first position is a closed position.

16. The light assembly of claim 15, wherein the second position is an open position.

17. The light assembly of claim 16, wherein a majority of the beam is reflected downwardly when the lens is in the second position.

18. A light assembly coupleable with a housing, the light assembly having:
- a power source,
- a light source coupled with the power source to produce a beam of light,
- a switch coupled with the power source and the light source, the switch being adapted to activate the light source, and
- a lens spaced apart from and slidable with respect to the light source, the lens having first and second portions and a reflective surface, wherein the lens is adapted to move between an off position, a first position, and a second position;

wherein the beam projects away from the light source and passes through the second portion of the lens when the lens is in the first position, and wherein at least a portion of the beam is reflected downwardly by the reflective surface when the lens is in the second position.

19. The light assembly of claim 18, wherein the first portion of the lens has an angled member and wherein the reflective surface is located on the angled member.

20. The light assembly of claim 19, wherein the lens is coupled with the switch, whereby the light source is activated when the lens is moved from the off position to the first of second position.

* * * * *